United States Patent
Rajakarunanayake et al.

(10) Patent No.: US 6,810,413 B1
(45) Date of Patent: Oct. 26, 2004

(54) SYSTEM AND METHOD FOR PROVIDING INTERNET CONTENT USING HYBRID WIRELESS AND WIRE TECHNOLOGIES AT THE END USER SITE

(75) Inventors: Yasantha N. Rajakarunanayake, San Ramon, CA (US); Ronald R. Marquardt, Palo Alto, CA (US)

(73) Assignee: Covad Communitions Group, Inc., Santa Clara, CA (US)

( * ) Notice: Subject to any disclaimer, the term of this patent is extended or adjusted under 35 U.S.C. 154(b) by 608 days.

(21) Appl. No.: 09/609,571

(22) Filed: Jun. 30, 2000

(51) Int. Cl.[7] .............................................. G06F 15/16
(52) U.S. Cl. ...................... 709/203; 709/202; 709/206; 709/219; 709/229; 707/10; 725/109; 725/110
(58) Field of Search ................................ 709/200–207, 709/217–219, 227–229; 707/9–10, 100, 104.1; 725/105–106, 109–110, 112, 115

(56) References Cited

U.S. PATENT DOCUMENTS

| | | | |
|---|---|---|---|
| 5,794,250 A | * 8/1998 | Carino, Jr. et al. | 707/9 |
| 5,905,865 A | * 5/1999 | Palmer et al. | 725/112 |
| 5,987,233 A | 11/1999 | Humphrey | 709/217 |
| 6,028,867 A | 2/2000 | Rawson et al. | 370/463 |
| 6,286,049 B1 | 9/2001 | Rajakarunanayake et al. | 709/227 |
| 6,388,990 B1 | 5/2002 | Wetzel | 370/230 |
| 6,415,289 B1 | * 7/2002 | Williams et al. | 709/203 |
| 6,459,702 B1 | 10/2002 | Saaverda et al. | 370/422 |
| 6,463,079 B2 | 10/2002 | Sundaresan et al. | 370/468 |
| 6,463,528 B1 | 10/2002 | Rajakarunanayake et al. | 709/221 |
| 6,538,998 B1 | 3/2003 | Garimella | 370/241 |
| 6,580,718 B1 | 6/2003 | Chapman | 709/227 |
| 6,584,074 B1 | 6/2003 | Vasamsetti et al. | 370/254 |
| 6,587,883 B1 | 7/2003 | Rajakarunanayake | 709/227 |
| 6,594,695 B1 | 7/2003 | Vasamsetti et al. | 709/220 |
| 6,611,859 B1 | * 8/2003 | Kohno | 709/203 |
| 6,651,089 B1 | * 11/2003 | Stead | 709/217 |
| 6,657,994 B1 | 12/2003 | Rajakarunanayake | 370/352 |

OTHER PUBLICATIONS www.businessweek.com:/1999/99_44/b3653111.htm?script Framed (Nov. 01, 1999).
www.hns.com/products/snd/ro_es/resdiag.htm, no date.
www.hns.com/products/consol/hyb_es/hyb_es.htm, no date.
www.hns.com/products/consol/hyb_es/hesdiag.htm, no date.
Hughes Network Systems, "DirecPC Enterprise Edition," 1997.
Hughes Network Systems, "Receive Earth Station," 1998.
www.skycache.com/services/works.htm, no date.
www.ibeam.com/html/tech/tech_network.html, no date.

* cited by examiner

*Primary Examiner*—Bharat Barot
(74) *Attorney, Agent, or Firm*—Jung-hua Kuo

(57) ABSTRACT

Systems and methods for content delivery, such as Internet content, using hybrid wireless technology, such as satellite technology, and wire technology, such as twisted pair, cable, and fiber optic, at the end user site are disclosed. The system generally comprises a client premise equipment (CPE) at an end user subscriber site configured to send a request for content and to receive requested content signals and a wireless receiver at the end user site in communication with the CPE, the wireless receiver being configured to wirelessly receive the requested content signals. The CPE is in communication with a content request server adapted to receive the end content request via a wire connection and the CPE is configured to receive the requested content signals selectively transmitted by the content request server via one of the wire connection and wireless receiver. The wire connection may be over a twisted pair, cable, and/or fiber optic. Where the wire connection is over a twisted pair, the wire connection may use digital subscriber line (DSL) technology and optionally includes an ATM network.

22 Claims, 6 Drawing Sheets

SYSTEM AND METHOD FOR PROVIDING INTERNET CONTENT USING HYBRID WIRELESS AND WIRE TECHNOLOGIES AT THE END USER SITE

BACKGROUND OF THE INVENTION

1. Field of the Invention

The present invention relates generally to telecommunications. More specifically, systems and methods for Internet content delivery utilizing both wireless and wire technologies are disclosed.

2. Description of Related Art

With the increasing popularity of the Internet, the amount of traffic and congestion over the Internet is increasing. Internet content is typically delivered to the end user through the bandwidth-constrained Internet backbone via the end user's Internet service provider ("ISP"). In order to accommodate the increased traffic, Internet service providers must increase their bandwidth. In addition, providers of popular Internet content must also provide sufficient server capacity in order to support the increased access to their websites.

Internet content traditionally has included mostly static Web pages and graphics. However, richer forms of media that require significantly larger amounts of network capacity account for an increasing portion of Internet traffic growth and demand. These richer, broadband forms of media include audio and/or video streaming such as MP3 audio and RealVideo, whether delivered live or on-demand. Such richer forms of media require greater capacity from content provider servers, as well as greater capacity in the networks they traverse. As a result, the delivery of such rich content through the bandwidth-constrained Internet backbone often results in unsmooth sounds and/or small, shaky images for the end users.

Rather than rely on wire mechanisms, such as twisted copper pairs or POTS (plain old telephone service), coaxial cables, and optical fibers, some content providers and/or ISPs have utilized alternative Internet content delivery systems, in an attempt to bypass the Internet backbone and deliver Internet content to the end user more quickly and reliably.

In particular, many content providers and/or ISPs have utilized wireless or extraterrestrial mechanisms, such as satellite technology, to deliver content and/or Webcast programming to the end users with adequate bandwidth and broadband network performance. One key advantage of satellites is their ability to bounce signals from one source to many destinations, i.e., a one-to-many paradigm.

iBeam Corporation's iBeam Broadcasting network is one example of a satellite network for Internet content delivery. The iBeam Broadcasting network is a satellite service launched to bypass the bottlenecks of the Internet and to potentially allow millions of end users to view the same Internet content, static and/or streaming, simultaneously. Content providers such as broadcasters and producers typically pay for their content to be carried over the satellite network.

Another scheme is proposed by SkyStream Corporation. SkyStream's network enables broadcast, satellite, and cable television providers to stream popular Web sites and Webcasts over their unused broadcast bandwidth spectrum, enabling the Internet content to hitch a ride with digital satellite-TV traffic.

In addition, SkyCache Incorporated of Laurel, Md. similarly promulgates a broadband broadcast network that utilizes satellite technology to move high-bandwidth Internet data more quickly-to enterprises such as ISPs and corporations. SkyCache implements high-speed satellite datacasting systems for the movement of World Wide Web content, Usenet News, digital audio and video data streams, and the synchronization of distributed systems. The use of such technology reduces the need for ISPs to increase their terrestrial bandwidth for Internet connectivity.

The systems or networks promulgated by iBeam Corporation, SkyStream Corporation, and SkyCache Incorporated all transmit signals to regional data centers ("RDCs") or local enterprises such as ISPs and corporations. The regional data centers then relay the data to the remote end users via regional networks, thereby pushing content closer to the end users and bypassing any bottlenecks in the Internet backbone.

However, even with these systems and networks, another bottleneck for broadband media is the "last mile" linking the enterprises such as ISPs and corporations to the remote user. In particular, congestion in the regional data networks can result, especially for high-demand live events and webcasts. While multicast protocols exist for both Layer 2 (ATM) and Layer 3 (TCP/IP) networks, they are little deployed today as they increase management complexity to wire networks and do not easily interoperate (e.g., IP multicast mapping to ATM point-to-multipoint).

Hughes Network System's DirecPC is one method that purports to alleviate the bottleneck over the last mile. With Hughes' DirecPC, the end user personal computer sends outbound data and signals, such as URL requests, by modem over a telephone line to the ISP and receives high bandwidth responses from the Internet via satellite. In other words, signals are directly delivered via satellite to the remote end users such as businesses and homes, rather than to enterprises such as ISPs and corporations. The Hughes DirecPC technology transfers data received from the content provider over a DirecPC high-speed satellite channel to one or more personal computers at each remote end user site. Each remote end user site is provided with an antenna, outdoor electronics mounted on the antenna for signal reception/transmission, and indoor electronics for interfacing with the personal computer(s).

The Hughes' DirecPC generally works as follows. When the end user requests the contents at an URL, the DirecPC software loaded in the end user's PC attaches a "tunneling code," essentially an electronic addressing mask, to the URL, and the request is sent by modem to the end user's ISP. The tunneling code instructs the ISP to forward the URL request to the DirecPC Network Operations Center ("NOC") rather than to the server at the requested URL. The DirecPC NOC strips away the tunneling code from the received end user request and forwards the request to the appropriate site to retrieve the desired content. The DirecPC NOC then uploads the content to the DirecPC satellite, which in turn beams the requested content down to the end user's DirecPC dish and into the end user's PC. However, as the Hughes solution uses satellite for all requested content, except for those end users in remote locations, such delivery mechanism generally costs far more than delivery over a wired or terrestrial network.

SUMMARY OF THE INVENTION

Systems and methods for Internet content delivery using hybrid wireless and wire technologies are disclosed. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

The system for Internet content delivery using wireless technology and wire technology generally comprises a client premise equipment (CPE) at an end user subscriber site configured to send a request for content and to receive requested content signals as well as a wireless receiver at the end user site in communication with the CPE, the wireless receiver being configured to wirelessly receive the requested content signals. The CPE is in communication with a content request server adapted to receive the end content request via a wire connection. The CPE is configured to receive requested content signals selectively transmitted by the content request server via one of the wire connection and wireless receiver. The wire connection may be over a twisted pair, cable, and/or fiber optic. Where the wire connection is over a twisted pair, the wire connection may use digital subscriber line (DSL) technology and optionally includes an ATM network.

The system may further comprise a transmitter in communication with the content request server and configured to transmit signals received from the content request server, the transmitter being in wireless communication with the wireless receiver at the end user site. In addition, the system may also comprise a relay transmitter in communication with the transmitter and configured to transmit signals received from the transmitter, the relay transmitter being in wireless communication with the wireless receiver at the end user site. The system may further comprise a satellite downlink in communication with the content request server, the satellite downlink being in wireless communication with a satellite adapted to transmit the requested content signals to the content request server via the satellite downlink.

In another embodiment, a system for delivery of content to an end user subscriber using wireless technology and wire technology at an end user subscriber site generally comprises a server in communication with the Internet via a wire link and in communication with a CPE at the end user subscriber site via a wire connection and a wireless transmitter in communication with the server and configured to wirelessly transmit signals received from the server to the end user subscriber site. The server, in response to receiving a content request from the end user subscriber via the wire connection, selectively transmits the requested content to the end user via one of the wireless transmitter and the wire connection.

The method for requesting and receiving content at an end user subscriber site using hybrid wireless and wire technologies generally comprises transmitting an end user subscriber request for content via a CPE at the end user subscriber site to a content request server over a wire connection, selectively transmitting the requested content signals via the wire connection or a wireless connection by the content request server to the CPE, and receiving requested content signals at the CPE from the content request server via the wire connection or via a wireless connection.

The present invention allows the selection of the most appropriate or most economically viable mechanism for the delivery of particular content to the end users. Wired networks are most appropriate for the delivery of on-demand unicast content. However, for multicast and/or broadcast content, such as live events, where many end users are attempting to access identical content, such content is best sent via a wireless network as a wireless network is inherently broadcast in nature. It is noted that the wireless delivery mechanism typically utilizes IP multicast.

These and other features and advantages of the present invention will be presented in more detail in the following detailed description and the accompanying figures that illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF SPECIFIC EMBODIMENTS

Systems and methods for Internet content delivery using wireless technology and wire technology at the end user site are disclosed. The wireless technology may be satellite technology, for example, and the wire technology may be twisted pair, cable, and fiber optic, for example. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention may not be described or shown in detail so as not to unnecessarily obscure the present invention.

Examples of Internet Content Delivery Systems Using Wireless Technology

Figure 1:
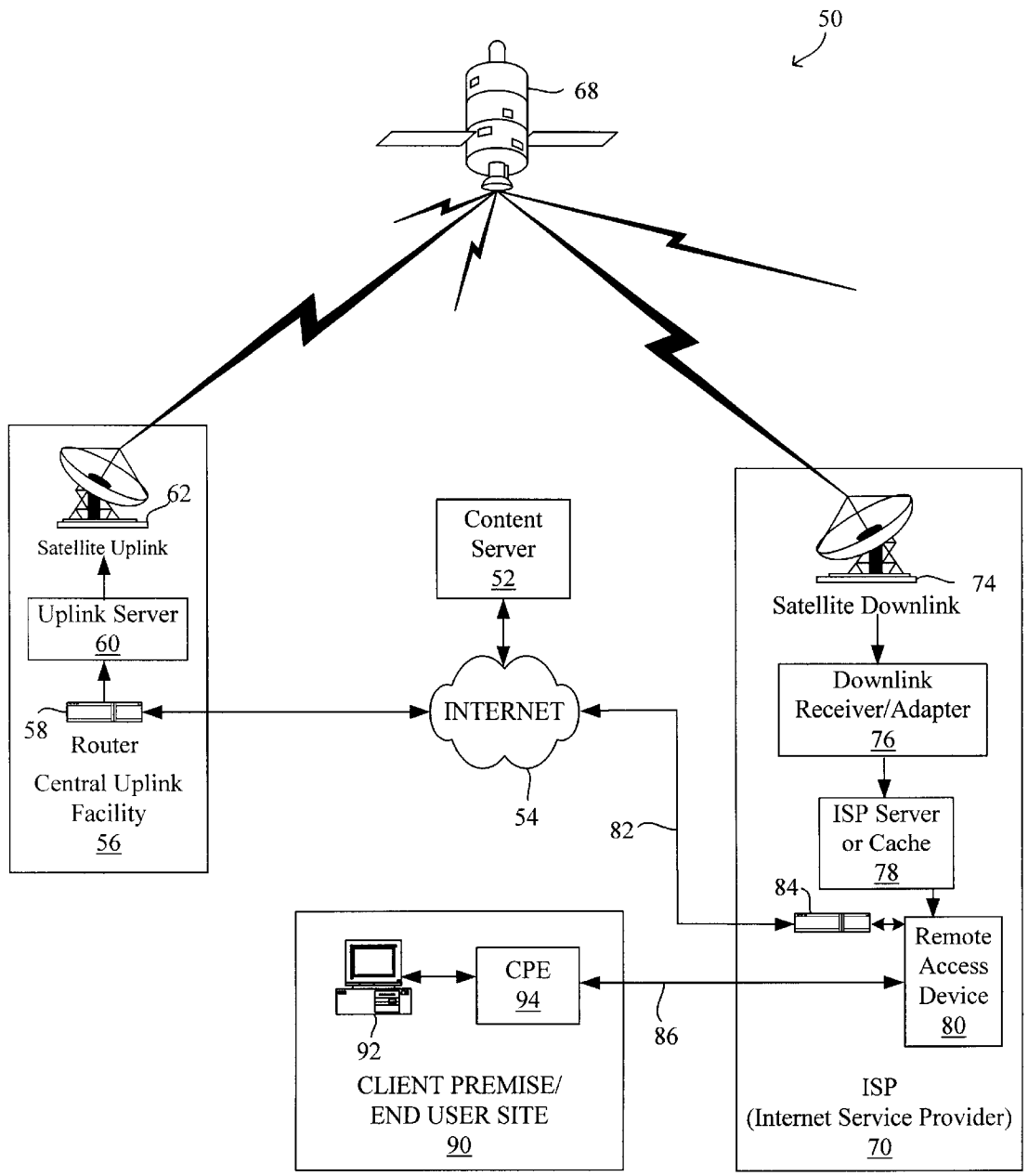
FIG. 1 is a block diagram illustrating an example of a system for delivery of Internet content to enterprises such as ISPs and corporate entities using satellite technology.
Figure 2:
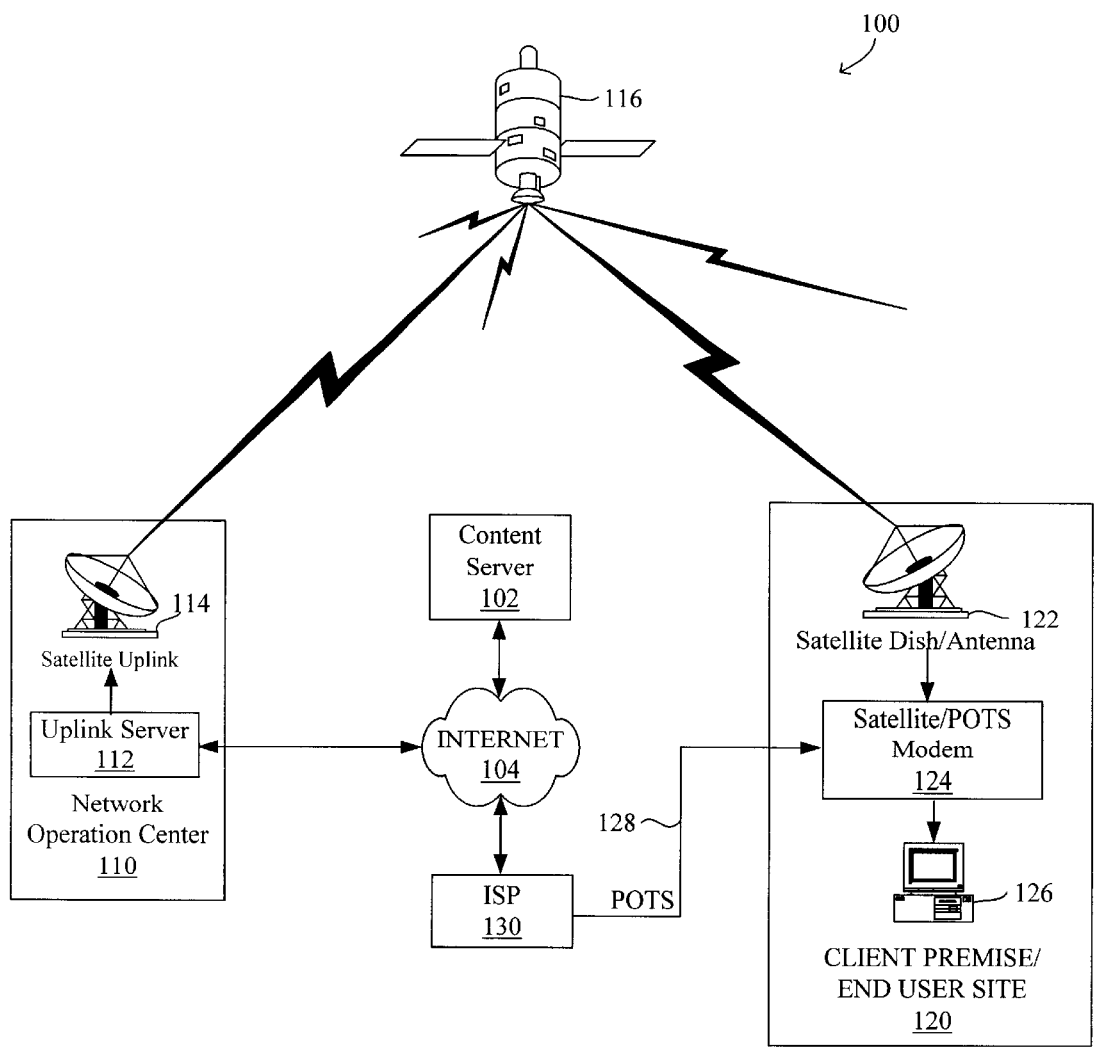
FIG. 2 is a block diagram illustrating an example of a system for delivery of Internet content to end users using satellite technology.

A general overview will be presented using examples of systems for delivery of Internet content using satellite technology to enterprises such as ISPs and corporate entities or to end users as shown in FIGS. 1 and 2. The overview will serve as basis for subsequent discussion of the systems and methods for Internet content delivery using wireless technology and wire technology at the end user site, for example.

FIG. 1 is a block diagram illustrating an example of a system 50 for delivery of Internet content to enterprises such as ISPs and corporate entities using satellite technology. As shown, the Internet content delivery system 50 generally comprises a central uplink facility 56 for uplinking the Internet content received from a content server 52 via the Internet 54 to a satellite 68, an ISP facility 70 for receiving the Internet content from the satellite 68 and/or directly via the Internet, and an end user subscriber premise 90 which can access the Internet 54 via the ISP 70. Each of these components of the system 50 for delivery of Internet content using satellite technology will now be described in more detail below.

The central uplink facility 56 generally comprises a router 58, an uplink server 60, and a satellite uplink 62. The router 58 of the central uplink facility 56 accesses desired Internet content via the Internet 54 and transmits the Internet content to the satellite 68 via the uplink server 60 and the satellite uplink 62.

The router 58 may access various Internet content at predetermined times as desired. For example, when the Internet content is constantly changing, such as stock quotes which change throughout certain hours of the weekday, the router may access the stock quote content real-time or near real-time only during these stock trading hours. As another example, when the Internet content changes less frequently, the router may access the Internet content periodically such as once every fifteen minutes, every hour, or every day, for example. Alternatively or additionally, the content server 52 may communicate to the central uplink facility 56 when the Internet content is to be updated, such as when the content at the content server 52 changes.

The satellite 68 in turn broadcasts the Internet content to subscribers of the satellite service, such as to the ISP facility 70. The ISP facility 70 generally comprises a satellite downlink 74 for receiving signals from the satellite 68, a downlink receiver/adapter 76, and an ISP downlink server or cache 78. The downlink receiver/adapter 76 processes the signals received by the satellite downlink 74 and forwards the processed Internet content signals to the ISP downlink server 78 which caches the Internet content. In particular, the downlink receiver/adapter 76 generally provides the Layer 1 and Layer 2 termination of the satellite link as well as the adaptation of that data to and from a traditional terrestrial network.

The ISP 70 may also access desired Internet content via wire or terrestrial means. Currently, much of the Internet content is provided by the content server 52 via the Internet 54 over various wire links 82 between the Internet 54 and a router 84, for example, of the ISP 70. Although not explicitly shown, the ISP 70 may also cache particular Internet content accessed via wire means.

The end user at the end user subscriber premise 90 requests and receives Internet content via the ISP 70 to which the end user subscribes. The end user subscriber premise 90 typically includes a computer 92 and a client premise equipment (CPE) 94, such as a DSL, cable, or a dial-up modem, for example. The CPE 94 is linked to the remote access device or equipment 80 of the ISP 70 via wire links 86. The remote access equipment 80 may be a dial-up RAS (Remote Access Service for voice band modems and ISDN), a DSLAM (DSL access multiplexer for DSL), cable head end equipment (for cable networks), or other remote access networking equipment, including aggregation and service management devices such as those provided by companies such as Redback Networks.

The remote access equipment 80 of the ISP 70 may determine whether to provide the desired Internet content to the end user with the cached content received from the satellite 68 or to provide the desired Internet content to the end user with the content received via wire links 82. Specifically, the end user's request for Internet content is received by the remote access device or equipment 80 via the wire links 86. The remote access device or equipment 80 accesses the desired Internet content either from the cached content received from the satellite 68 or via the wire links 82 and router 84. The remote access device or equipment 80 then delivers the Internet content to the CPE 94 and the computer 92 at the end user subscriber premise 90 via the wire links 86.

FIG. 2 is a block diagram illustrating an example of a system 100 for delivery of Internet content to end users using satellite technology. As shown, the Internet content delivery system 100 generally comprises a network operation center (NOC) 110 for retrieving Internet content from a content server 102 via the Internet 104 and uplinking the retrieved Internet content to a satellite 116, an end user site 120, and an ISP 130. DirecPC™, promulgated by Hughes Satellite Systems, is an example of such a system for providing Internet content using satellite technology. Each of these components of the system 100 for delivery of Internet content using satellite technology will now be described in more detail below.

The end user site 120 comprises an antenna or satellite dish 122 for receiving Internet content signals from the satellite 116, a satellite/POTS (Plain Old Telephone Service) modem 124, and a personal computer (PC) 126 for sending Internet content requests to and receiving Internet content from the satellite/POTS modem 124. The satellite/POTS modem 124 is linked to the satellite dish 122 and to a POTS line 128. The PC 126 sends Internet content requests to the NOC 110 via the ISP 130 over the POTS line 128 and via the Internet 104.

When the end user requests specific Internet content, the request is sent by the PC 126 to the ISP 130 to which the end user subscribes via the satellite/POTS modem 124 over the POTS line 128. However, prior to sending the request, the PC 126 modifies the request by attaching a tunneling code, i.e., an electronic addressing mask, to the request. The tunneling code in effect instructs the ISP 130 to forward the Internet content request to the NOC 110 rather than to the content server 102 corresponding to the requested Internet content.

After receiving the Internet content request with the attached tunneling code, the NOC 110 strips the tunneling code from the request and forwards the stripped Internet content request to the corresponding content server and retrieves the desired Internet content via the Internet. The NOC 110 then uploads the retrieved Internet content to the satellite 116. The satellite 116 in turn broadcasts or beams the Internet content down to the end user's antenna/satellite dish 122. The Internet content is then forwarded to the PC 126 from antenna/satellite dish 122 via satellite/POTS modem 124.

As is evident, the system 100 utilizes the POTS link 128 for transmitting the lower bandwidth Internet content request. However, the system 100 directly receives Internet content signals from the satellite 116 at the end user site 120 using the satellite dish 122 to bypass the POTS link 128 for the higher bandwidth transmission of receiving the Internet content itself.

Providing Internet Content Using Hybrid Wire and Wireless Technologies

Examples of Internet content delivery utilizing satellite technology having been presented, the systems and methods for Internet content delivery using wireless technology and wire technology at the end user site will now be described in more detail with reference to FIGS. 3–5. For purposes of clarity and by way of example, an embodiment utilizing DSL technology as the wire or terrestrial technology is described below although any suitable wire technologies, such as cable, POTS, or fiber-based technologies, may be implemented.

Figure 3:
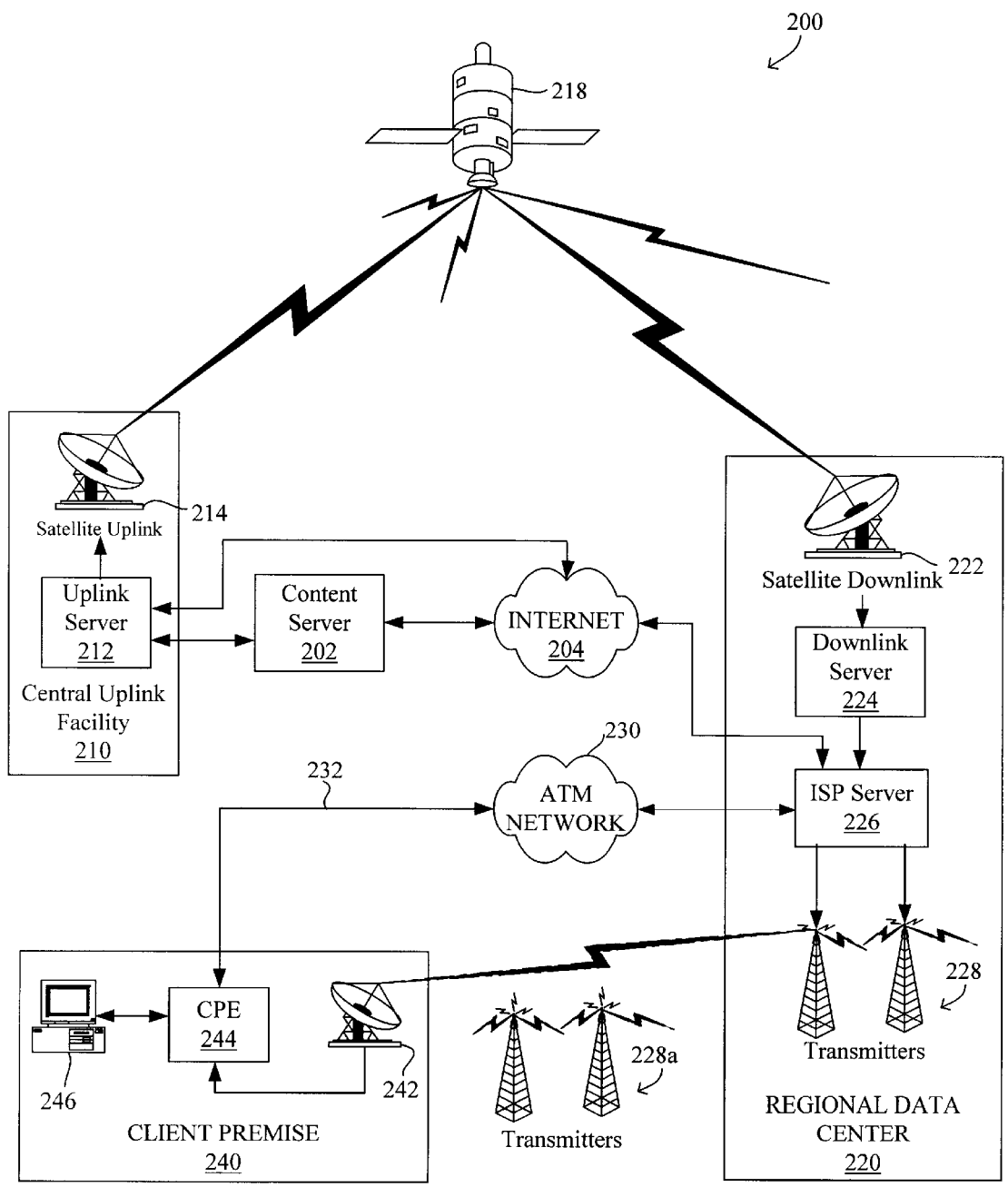
FIG. 3 is a block diagram illustrating a system for delivery of Internet content to end users using wire and wireless technologies at end user subscriber premise.

FIG. 3 is a block diagram illustrating a system 200 for delivery of Internet content to end users using wire and wireless technologies. As shown, Internet content delivery system 200 generally comprises a central uplink facility 210 for retrieving Internet content from a content server 202, either directly or via the Internet 204 and uplinking the retrieved Internet content to a satellite 218, a regional data center 220 for receiving the Internet content signals transmitted via wire and/or wireless means and for transmitting the received Internet content signals to subscribers via wireless means and wire means over a Regional Access Network such as an ATM network 230, and a subscriber premise 240. Each of these components of the system 200 for delivery of Internet content using wire and wireless technologies will now be described in more detail below.

The regional data center 220 may be provided by a CLEC (competitive local exchange carrier) such as Covad Communications Group, Inc., assignee of the subject patent application, an ISP, or any other suitable entity. The regional data center 220 generally comprises a satellite downlink 222, a downlink server 224, an ISP server 226, and one or more transmitters 228. Unless the data is part of a live event, at least a portion of the data received by the ISP server 226, such as Internet content received via the satellite downlink 22 and/or received from the Internet via wire transmission, is preferably cached at the regional data center 220.

The satellite downlink 222 receives the Internet content signals transmitted by the satellite 218. The downlink server 224 provides the Layer 1 and Layer 2 termination of the satellite link and the adaptation of that data to and from a traditional terrestrial network, which is in turn transmitted to the ISP server 226 for transmission via wire and wireless means to end user subscribers. The regional data center 220 optionally utilizes transmitters 228 as the wireless means and the Regional Access Network 230 as the wire or terrestrial means to transmits the signals to the end user subscribers. The Regional Access Network 230 may, for example, utilize ATM or MPEG transport technology, or may consist of point-to-point tunnels built on L2TP, IPSec, or other Layer 3 protocols. Optionally, the Regional Access Network 230 may in fact be a Layer 3 network based upon TCP/IP or other protocols which is not multicast capable, and thus is not economically efficient at transporting broadcast or other live events.

Any suitable wireless technologies may be used to transmit signals from the regional data center 220 to the client premise 240. Examples of suitable wireless technologies include LMDS (Local Multipoint Distribution Service or System) and MMDS (Multichannel Multipoint Distributed Service or System). Typically, wireless transmission using MMDS technology can reach distances of up to approximately 40 miles while wireless transmission using LMDS technology can only reach distances of up to approximately 5 to 6 miles but can transmit a large bandwidth.

In addition, any suitable wireless modulation technologies may also be used to modulate data. One example of a suitable wireless modulation technology may be QPSK (Quadrature Phase Shit Keying) which transmits data by changing the phase of a transmitted waveform among any of certain discrete values.

The end user subscriber 240 generally comprises a receiver 242, a client premise equipment (CPE) 244, such as a modem, and a computer 246. Although not shown, one or more LANs or Ethernets at the end user subscriber premise 240 may be connected to one or more data ports of the CPE 244. In addition, one or more computers 246 at the end user subscriber premise 240 may be connected to the LANs. The receiver 242, such as an antenna, a satellite receiver or a satellite dish, receives the Internet content signals transmitted by the transmitters 226 at the regional data center 220. The signals received from the receiver 242 are forwarded to the computer 246 via the CPE 244.

The receiver 242 at the client premise 240 is optionally of a relatively small size and is capable of receiving signals from the transmitters 228 at the regional data center 220. For example, if the transmitters 228 are LMDS or MMDS transmitters, the receiver 242 would be a corresponding LMDS or MMDS receiver. The bandwidth of the receiver 242 is preferably on the order of gigabits per second. However, the receiver 242 may have much smaller bandwidth.

Typically, the regional data center 220 utilizes the wireless transmission mechanism for high bandwidth content such as live feeds and/or for content which is accessed by a large number of subscribers. One advantage for utilizing the additional wireless transmission mechanism is a reduction in load on the Regional Access Network 230 as well as eliminating the need to replicate data for transmission to multiple end user subscribers. In particular, the ISP server 226 need only transmit the requested data to the transmitters 228 once such as in the case of a live feed data stream rather than replicate the data for each end user subscriber requesting the content. In the absence of such technology, it may only be cost-efficient to utilize multicast technologies to provide broadcast events over the Regional Access Network 230. Practical implementation limitations, however, such as the mapping of end user IP multicast requests to ATM point-to-multipoint joins, for example, make the deployment of multicast typically infeasible, and motivate the invention described herein.

Relay transmitters 228a may be located between the regional data center 200 and the client premise 240. The relay transmitters 228a serve to relay data transmitted from the transmitters 228 at the regional data center 220 to other relay transmitters (not shown) and/or to the receiver 242 at the client premise 240. The need for as well as the number and positions of relay transmitters 228a may depending upon, for example, the distance of the client premises 240 to the corresponding regional data center 200 and the transmission range of and the particular transmission technology utilized by the transmitters 228.

The CPE 244 at the subscriber premise 240 is preferably additionally linked to the ISP server 226 via the Regional Access Network 230 over a wire connection or link 232 such as DSL link or loop. Although not shown, signals delivered and sent via the wire link 232 to and from the subscriber premise 240 are generally multiplexed along with signals from other end user subscriber premises between the Regional Access Network 230 and the ISP server 226. The CPE 244 may include at least three ports for connection to the computer 246, the wire link 232, and the wireless receiver 242 respectively.

The regional data center 220 or the ISP server 226 in particular may implement a policy based routing scheme for determining whether to transmit content to the client premise via wire or wireless transmission mechanism. For example, not all subscribers of the ISP may have a wireless receiver 242 to receive the data signals from the transmitters 228 at the regional data center 200. For such subscribers, signals must be transmitted via the wire connection, such as via the Regional Access Network 230 and the DSL link 232.

As another example of a policy based routing scheme, the policy based routing scheme may by default utilize the transmitters 228 to wirelessly transmit all data received via satellite downlink 222 to the client premise 240. In addition, the policy based routing scheme may also by default utilize the wire link, such as the Regional Access Network 230 and the DSL link 232, to transmit all data received from the Internet 204 through wire connections. Typically, it is desirable to transmit images of Web pages via the wire connection and to transmit any multicast or broadcast data and/or streaming data such as video and/or sounds via the wireless transmission mechanism, especially if the latter require multicast support.

Another policy based routing scheme that may be implemented by the regional data center 220 may depend upon traffic load balancing so as to maximize the aggregate bandwidth of both the wire and wireless transmission mechanism. For example, the policy based routing scheme may utilize the wireless transmission scheme when the number of subscribers to which non-streaming and/or streaming content is to be transmitted exceeds a certain threshold level. As such, the wireless transmission mechanism is utilized to alleviate traffic over the wire transmission mechanism.

Figure 4:
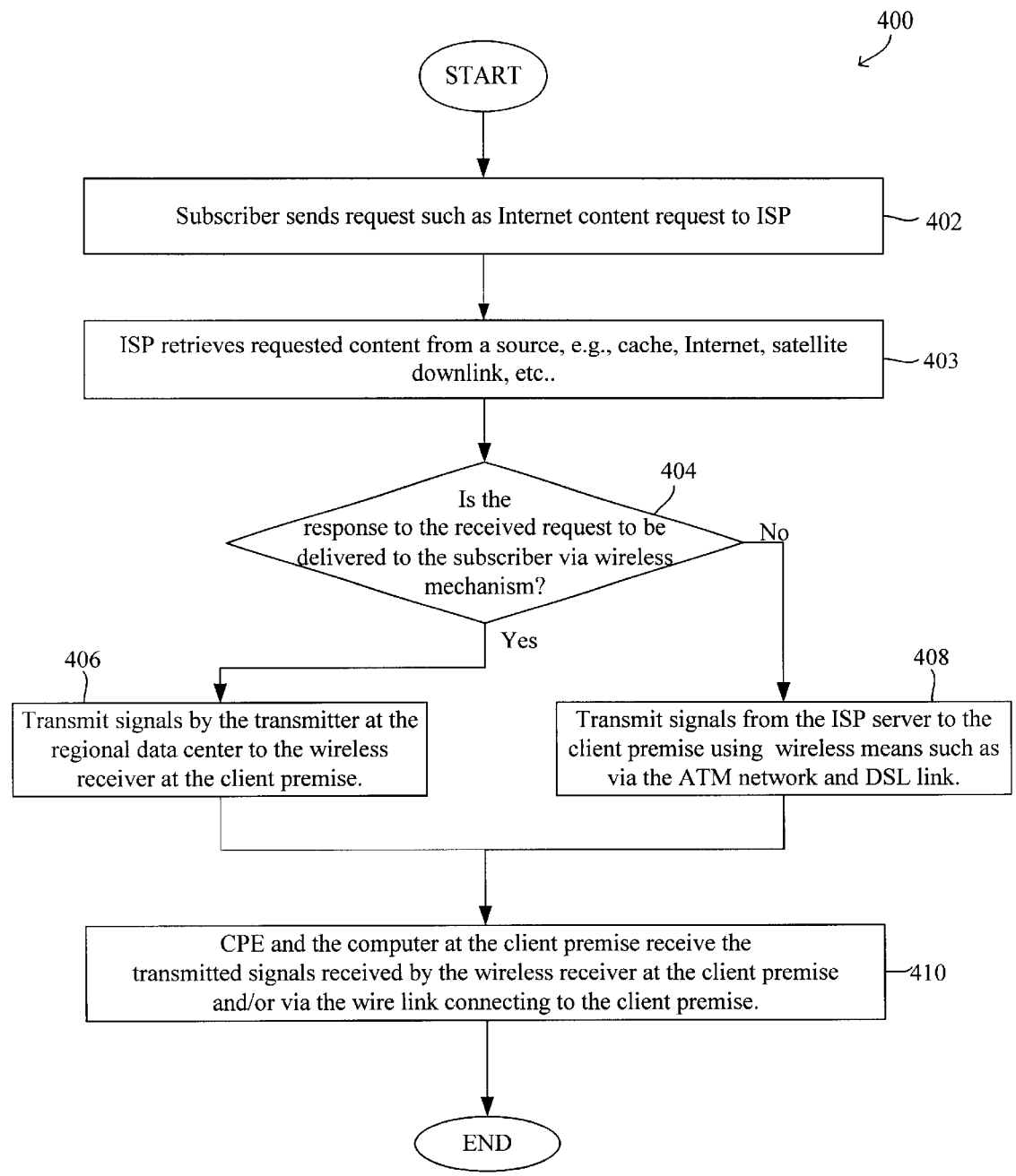
FIG. 4 is a flow chart illustrating a process for delivery of Internet content to end users using the wire and wireless system of FIG. 3.

FIG. 4 is a flow chart illustrating a process 400 for delivery of Internet content to end users using a system such as the wire and wireless system of FIG. 3. At step 402, the subscriber sends a request for access to particular content. The subscriber request is optionally sent via a Regional Access Network over a DSL link. At step 403, the ISP retrieves the requested content from a source such as from cache, Internet, or satellite downlink.

At step 404, the ISP server determines whether the response to the received subscriber request is to be delivered to the subscriber via wireless mechanism. For example, the ISP server and/or the ISP downlink server may contain a database of requests that are to be delivered to the end user subscriber via wireless mechanism. Such a database may be static or dynamic. A dynamic database may optionally depend upon the signals received by the satellite downlink and processed by the downlink server. In another embodiment, upon receiving the subscriber request, the downlink server and/or the ISP server may examine the signals received by the satellite downlink that are available for transmission via wireless means to determine whether there is a match with the subscriber request. If there is a match, the response to the received subscriber request will be delivered to the subscriber via wireless mechanism. Otherwise, if it is determined that the response to the received request is not to be delivered to the subscriber via wireless mechanism, the response to the received subscriber request will be delivered to the subscriber via wire mechanism.

Step 404 may also include determining whether wireless transmission is supported at the end user subscriber client site. For example the ISP may have subscribers with wire and wireless connections as well as subscribers with wire connections only. Where a subscriber has only wire connection and no wireless connection, i.e., no wireless receiver, the ISP server may deliver the requested content to the CPE via the wire connection or deliver a response indicating that the subscriber cannot receive the requested content as the requested content may only be available to subscribers equipped with a wireless receiver.

Typically, where the signals received by the regional data center are received using wireless means, such as via the satellite downlink, the signals are typically also transmitted to the end user subscriber using wireless means, such as by transmitters to the wireless receiver at the client premise. Similarly, where the signals received by the regional data center are received using wire means, the signals are typically also transmitted to the end user subscriber using wire means, such as over the DSL link via the ATM network. However, it is to be understood that although not typically preferred, signals received by the regional data center using wire means may be transmitted to the end user subscriber using wireless means and/or signals received by the regional data center using wireless means may be transmitted to the end user subscriber using wire means. For example, it may be necessary to transmit all data using a wire mechanism to the client premise where the client premise does not include a wireless receiver capable of receiving wireless transmissions from the regional data center. In one scenario, if the content is locally hosted, then the hosted data may be updated once via wire to the content server 202 but delivered to end users using wireless mechanism.

If it is determined that the response to the subscriber request is to be transmitted to the end user via wireless means, at step 406, the signals are transmitted by the transmitter at the regional data center to the wireless receiver at the client premise. Alternatively, if it is determined that the response to the subscriber request is to be transmitted to the end user via wire means, at step 408, the signals are transmitted to the client premise via the ATM network and DSL link, for example.

Finally, at step 410, the CPE and the computer at the client premise receive the transmitted signals received by the wireless receiver at the client premise and/or via the wire link connecting to the client premise.

Figure 5:
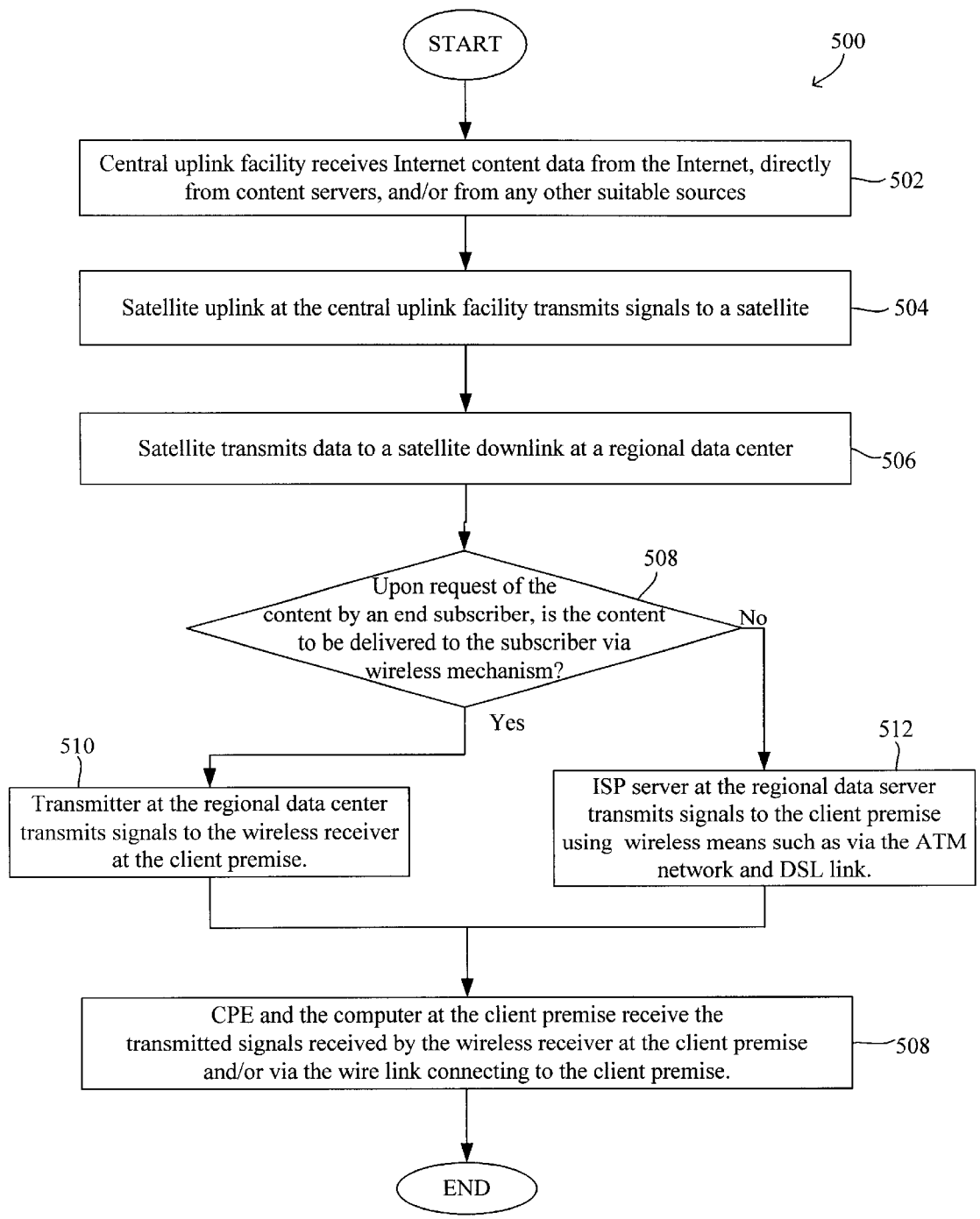
FIG. 5 is a flow chart illustrating a process for delivery of Internet content to end users using wire and wireless technologies.

FIG. 5 is a flow chart illustrating a process 500 for delivery of content such as Internet content to end users using wire and wireless technologies at the client premise. At step 502, a central uplink facility receives Internet content data from the Internet, directly from content servers, and/or from any other suitable sources. In particular, the central uplink facility may receive content from a live feed from the broadcaster, such as an exclusive broadcast of a live event. As another example, the central uplink facility may receive content from a broadcast and serves to retransmit the broadcast content. Although not required, the central uplink facility preferably only receives or retrieves content from the Internet for non-streaming and/or low bandwidth content whereas high bandwidth content may be provided via the content server that is local to and/or directly attached with the central uplink facility and/or the regional transmitters.

At step 504, the satellite uplink at the central uplink facility transmits signals to a satellite. At step 506, the satellite transmits data to a satellite downlink at a regional data center, for example. At step 508, upon receipt of a request of the content from an end subscriber, the regional data center determines whether the content is to be delivered to the subscriber via wireless or wire mechanism. This is typically referred to as the "last mile." As noted, any data received using wireless mechanism, such as received by the satellite downlink at the regional data center is preferably transmitted to the client premise via wireless means.

If it is determined that the data requested by the subscriber is to be transmitted to the client premise using wireless mechanism, the transmitter connected to the regional data center transmits the signals to the wireless receiver at the client premise at step 510. Alternatively, if it is determined that the data is to be transmitted to the client premise using wire mechanism, the ISP server at the regional data server transmits the signals to the client premise using wired means such as via the ATM network and DSL link, for example, at step 512.

Finally, at step 514, the CPE and the computer at the client premise receive the transmitted signals received by the wireless receiver at the client premise and/or via the wire link connecting to the client premise.

Figure 6:
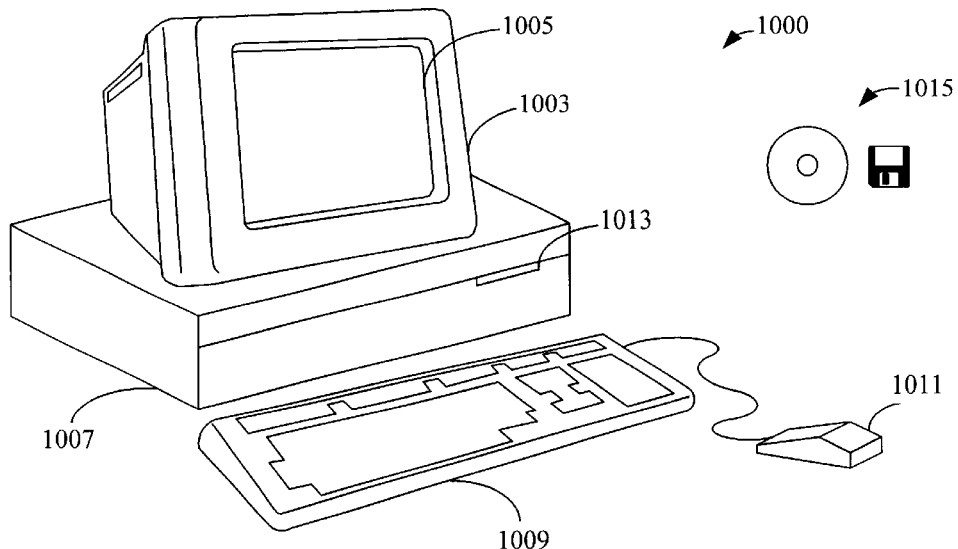
FIG. 6 illustrates an example of a computer system that can be utilized with the various embodiments of method and processing described herein.
Figure 7:
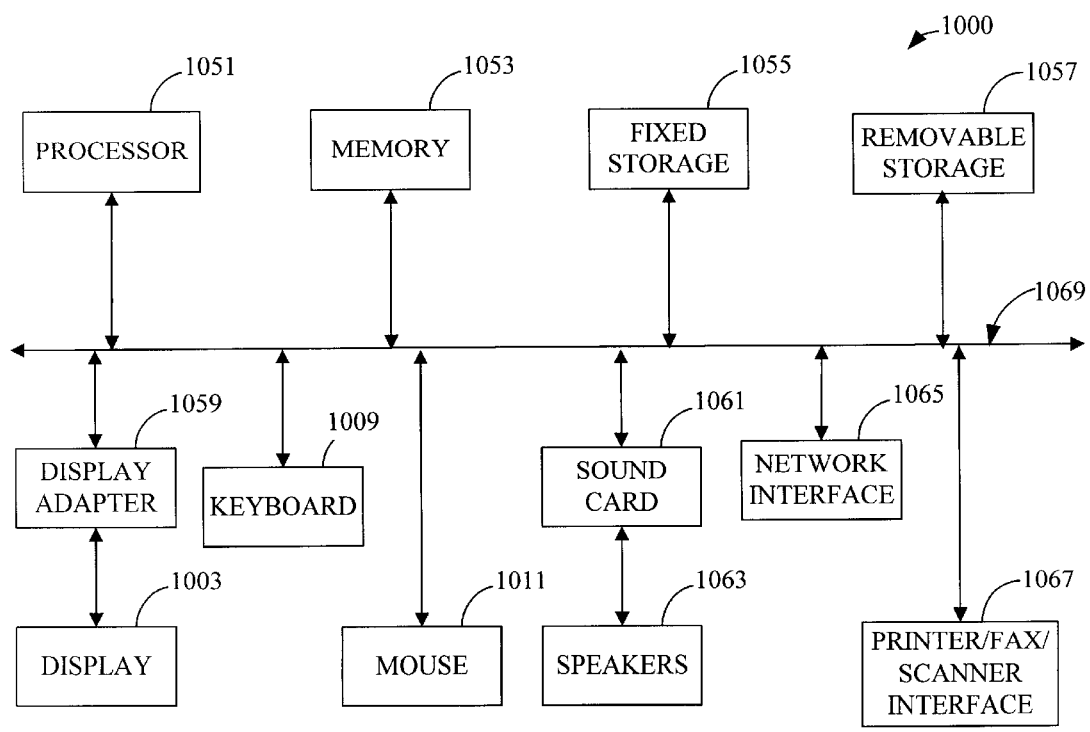
FIG. 7 illustrates a system block diagram of the computer system of FIG. 6.

FIGS. 6 and 7 illustrate a schematic and a block diagram, respectively, of an example of a general purpose computer system 1000 suitable for executing software programs that implement the methods and processes described herein. The architecture and configuration of the computer system 1000 shown and described herein are merely illustrative and other computer system architectures and configurations may also be utilized.

The illustrative computer system 1000 includes a display 1003, a screen 1005, a cabinet 1007, a keyboard 1009, and a mouse 1011. The mouse 1011 can have one or more buttons for interacting with a GUI (graphical user interface) that may be displayed on the screen 1005. The cabinet 1007 typically house one or more drives to read a computer readable storage medium 1015, system memory 1053, and a hard drive 10155, any combination of which can be utilized to store and/or retrieve software programs incorporating computer codes that implement the methods and processes described herein and/or data for use with the software programs, for example. Examples of computer or program code include machine code, as produced, for example, by a compiler, or files containing higher level code that may be executed using an interpreter.

Computer readable media may store program code for performing various computer-implemented operations and may be encompassed as computer storage products. Although a CD-ROM and a floppy disk 1015 are shown as exemplary computer readable storage media readable by a corresponding CD-ROM or floppy disk drive 1013, any other combination of computer readable storage media can be utilized. Computer readable medium typically refers to any data storage device that can store data readable by a computer system. Examples of computer readable storage media include tape, flash memory, system memory, and hard drive may alternatively or additionally be utilized. Computer readable storage media may be categorized as magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. Further, computer readable storage medium may also encompass data signals embodied in a carrier wave, such as the data signals embodied in a carrier wave carried in a network. Such a network may be an intranet within a corporate or other environment, the Internet, or any network of a plurality of coupled computers such that the computer readable code may be stored and executed in a distributed fashion.

Computer system 1000 comprises various subsystems. The subsystems of the computer system 1000 may generally include a microprocessor 1051, system memory 1053, fixed storage 1055 (such as a hard drive), removable storage 1057 (such as a CD-ROM drive), display adapter 1059, sound card 1061, transducers 1063 (such as speakers and microphones), network interface 1065, and/or scanner interface 1067.

The microprocessor subsystem 1051 is also referred to as a CPU (central processing unit). The CPU 1051 can be implemented by a single-chip processor or by multiple processors. The CPU 1051 is a general purpose digital processor which controls the operation of the computer system 1000. Using instructions retrieved from memory, the CPU 1051 controls the reception and manipulation of input data as well as the output and display of data on output devices.

The network interface 1065 allows CPU 1051 to be coupled to another computer, computer network, or telecommunications network using a network connection. The CPU 1051 may receive and/or send information via the network interface 1065. Such information may include data objects, program instruction, output information destined to another network. An interface card or similar device and appropriate software implemented by CPU 1051 can be used to connect the computer system 1000 to an external network and transfer data according to standard protocols. In other words, methods and processes described herein may be executed solely upon CPU 1051 and/or may be performed across a network such as the Internet, intranet networks, or LANs (local area networks), in conjunction with a remote CPU that shares a portion of the processing. Additional mass storage devices (not shown) may also be connected to CPU 1051 via the network interface 1065.

The subsystems described herein are merely illustrative of the subsystems of a typical computer system and any other suitable combination of subsystems may be implemented and utilized. For example, another computer system may also include a cache memory and/or additional processors 1051, such as in a multi-processor computer system.

The computer system 1000 also includes a system bus 1069. However, the specific buses shown are merely illustrative of any interconnection scheme serving to link the various subsystems. For example, a local bus can be utilized to connect the central processor to the system memory and display adapter.

The computer system 1000 may be illustrative of the computer system of any of the service providers or the end-user or subscriber.

While the above is a complete description of preferred embodiments of the invention, various alternatives, modifications, and equivalents can be used. For example, wire technology for providing Internet content may utilize xDSL technologies as well as other wire technologies such as fiber optic, cable, ISDN technologies, for example. It should be evident that the invention is equally applicable by making appropriate modifications to the embodiments described above. Therefore, the above description should not be taken as limiting the scope of the invention that is defined by the appended claims along with their full scope of equivalents.

What is claimed is:

1. A system for content delivery to an end user subscriber using hybrid wireless and wire technologies at an end user subscriber site, comprising:

a client premise equipment at an end user subscriber site, said client premise equipment being configured to send an end user subscriber request for content and to receive requested content signals;

a wireless receiver at the end user site in communication with said client premise equipment, said wireless receiver being configured to wirelessly receive said requested content signals;

said client premise equipment being in communication with a content request server adapted to receive said end user subscriber request for content via a wire connection;

said client premise equipment being further configured to receive said requested content signals selectively transmitted by the content request server via one of said wire connection and wireless receiver.

2. The hybrid wire and wireless system for content delivery to the end user subscriber of claim 1, wherein said wire connection is selected from the group consisting of twisted pair, cable, and fiber optic.

3. The hybrid wire and wireless system for content delivery to the end user subscriber of claim 1, wherein said wire connection between said client premise equipment and said content request server is over a twisted pair using digital subscriber line technology for transmission of said request for content and said requested content signals.

4. The hybrid wire and wireless system for content delivery to the end user subscriber of claim 3, wherein said wire connection between said client premise equipment and said content request server includes an ATM network.

5. The hybrid wire and wireless system for content delivery to the end user subscriber of claim 1, further comprising:
the content request server in communication with said client premise equipment, said content request server being adapted to receive said end user subscriber request for content via said wire connection; and
a transmitter in communication with said content request server and configured to transmit signals received from said content request server, said transmitter being in wireless communication with said wireless receiver at the end user site.

6. The hybrid wire and wireless system for content delivery to the end user subscriber of claim 1, further comprising a second transmitter in communication with said transmitter and configured to transmit signals received from said transmitter, said second transmitter being in wireless communication with said wireless receiver at the end user site.

7. The hybrid wire and wireless system for content delivery to the end user subscriber of claim 1, wherein said content request server is in communication with the Internet.

8. The hybrid wire and wireless system for content delivery to the end user subscriber of claim 1, further comprising a satellite downlink in communication with said content request server, said satellite downlink being in wireless communication with a satellite adapted to transmit said requested content signals to said content request server via said satellite downlink.

9. The hybrid wire and wireless system for content delivery to the end user subscriber of claim 1, wherein said requested content is selected from the group consisting of a webpage and streaming data.

10. The hybrid wire and wireless system for content delivery to the end user subscriber of claim 9, wherein when the requested content is streaming data, the requested content is received by the client premise equipment via the wireless receiver.

11. The hybrid wire and wireless system for content delivery to the end user subscriber of claim 9, wherein when the requested content is a webpage, the requested content is received by the client premise equipment via the wire connection.

12. A method for requesting and receiving content at an end user subscriber site using wireless technology and wire technology, comprising:
transmitting an end user subscriber request for content via a client premise equipment at the end user subscriber site to a content request server over a wire connection to the content request server;
receiving requested content signals at the client premise equipment from the content request server via one of the wire connection to the content request server and a wireless connection to the content request server; and
selectively transmitting the requested content signals via one of said wire connection and wireless connection by the content request server.

13. The method for requesting and receiving content at the end user subscriber site of claim 12, wherein said selectively transmitting includes determining whether wireless transmission is supported at the end user subscriber client site.

14. The method for requesting and receiving content at the end user subscriber site of claim 12, wherein said transmitting the end user subscriber request for content is transmitting over one of twisted pair, cable, and fiber optic.

15. The method for requesting and receiving content at the end user subscriber site of claim 12, wherein said transmitting the end user subscriber request for content to the content request server over the wire connection is transmitting over a twisted pair using digital subscriber line technology.

16. The method for requesting and receiving content at the end user subscriber site of claim 15, wherein said transmitting the end user subscriber request for content to the content request server over the wire connection includes transmitting over an ATM network.

17. The method for requesting and receiving content at the end user subscriber site of claim 12, wherein said receiving the requested content signals at the client premise equipment from the content request server via the wireless connection is via a wireless receiver at the end user subscriber site, the wireless receiver being in wireless communication with the content request server.

18. A system for delivery of content to an end user subscriber using wireless technology and wire technology at an end user subscriber site, comprising:
a server in communication with the Internet via a wire link and in communication with a client premise equipment at the end user subscriber site via a wire connection;
a wireless transmitter in communication with the server and configured to wirelessly transmit signals received from the server to the end user subscriber site;
wherein in response to receiving a content request from the end user subscriber via the wire connection, the server selectively transmits requested content to the end user via one of the wireless transmitter and the wire connection.

19. The system for delivery of content to an end user subscriber according to claim 18, further comprising a satellite downlink in communication with the server, the satellite downlink configured to wirelessly receive content signals from a transmitting satellite.

20. The system for delivery of content to an end user subscriber according to claim 19, wherein the server transmits the requested content to the end user via the wireless transmitter when the server receives the requested content from the satellite downlink and the server transmits the requested content to the end user via wire connection when the server receives the requested content from the Internet.

21. The system for delivery of content to an end user subscriber according to claim 18, wherein the server selects transmission to the end user via one of the wireless transmitter and the wire connection based upon the content requested.

22. The system for delivery of content to an end user subscriber according to claim 18, wherein the wire connection between the client premise equipment at the end user subscriber site and the server is selected from the group consisting of twisted pair, cable, and fiber optic.

* * * * *